Patented Apr. 27, 1943

2,317,757

UNITED STATES PATENT OFFICE 2,317,757

ALKYLENE-POLYAMINES AND A PROCESS OF PREPARING THEM

Roderich Graf, Frankfort-on-the-Main-Unterliederbach, Germany; vested in the Alien Property Custodian No Drawing. Application April 4, 1941, Serial No. 386,871. In Germany April 12, 1940

4 Claims. (Cl. 260—570.9)

This invention relates to the manufacture of polyamine derivatives and especially it relates to alkylene-polyamines monosubstituted in one of the amino groups and to the products thus obtained.

I have found that alkylene polyamines monosubstituted in one of the amino groups may be obtained by condensing alkylene-polyamines with a member of the group consisting of aldehydes and ketones and catalytically hydrogenating the condensation product.

It is already known that during the reaction of diamines and aldehydes both amino groups react with the aldehyde with formation of a dialkylidene compound; they react even if the diamine is used in excess, compare for instance Kolda, "Monatshefte fur Chemie", 19, 610, 1898; A. T. Mason, "Berichte der Deutschen Chemischen Gesellschaft," 20, 267, 1887; J. v. Alphen, "Rec. Trav. Chim.", Pays Bas, 54, 595, 1935. This behaviour is in accordance with the fact that diamines substituted at both sides are obtained also by similar reactions, such as an acylation, even if the diamine is used in excess. The formation of monoalkyl derivatives in the present process was, therefore, surprising.

Aliphatic polyamines which may be used for the present invention are for instance ethylene-diamine, propylene-diamine, diethylene-triamine, triethylene-tetra-amine and diamines the amino groups of which are linked to each other by long alkylene chains, as it is the case with tetramethylene-diamine, pentamethylene-diamine and hexamethylene-diamine.

Among the aldehydes and ketones which are to serve as alkylation components all kinds of them have proved to be suitable for this purpose. Thus, both the lower and the higher molecular aliphatic aldehydes may be used, as for instance formaldehyde, acetaldehyde, propionaldehyde, butyraldehyde, heptanal, alpha-ethyl-hexanal, laurinaldehyde, oleylaldehyde, cyclohexanon and acetophenon, furthermore aromatic monocyclic aldehydes such benzaldehyde, anisaldehyde and aldehydes derived from heterocyclic compounds, as for instance furfurol and pyridinaldehyde.

The ordinary catalysts employed in hydrogenation processes can also be made use of in the present invention. They may consist of nickel, cobalt, a mixture of nickel and copper, palladium or platinum. The hydrogenation is preferably performed with the application of pressure, for instance at 20–80 atmospheres and at an elevated temperature, e. g. at about 60° C.–150° C.

In order to attain as high a yield as possible of mono-substitution products, the polyamine and the aldehyde are suitably reacted with each other in a molecular proportion. The aldehyde may also be used in a smaller quantity; mono-substitution products are then obtained in a very good yield besides unaltered poly-amine. Even if 1 mol of polyamine is caused to react with 2 mols of aldehyde, there are formed considerable quantities of the monoalkyl compound besides the dialkyl compound and unaltered amine.

The catalytic hydrogenation of the condensation product of the polyamine and the aldehyde or the ketone may be performed in the reaction mixture without isolating the product. Diluents, as for instance methyl alcohol or ethyl alcohol may be employed. Of course it is also possible first to separate the pure condensation product, namely the dialkylidene compound and to start thereafter with the hydrogenation process.

The products thus obtained are valuable intermediate products, e. g. for the preparation of textile adjuvants.

The following examples serve to illustrate the invention, but they are not intended to limit it thereto, the parts being by weight:

1. 1000 parts of n-butyraldehyde are caused to flow, while cooling, into 1200 parts of ethylene-diamine mixed with 500 parts of methanol; 500 parts of a catalyst of 5 per cent of nickel and pumice-stone are added thereto. The mixture is hydrogenated for 12 hours at 90° C.–100° C. and at a pressure of 30–80 atmospheres. The reaction mixture freed from the catalyst is distilled; after the separation of the first runnings of methanol and unaltered ethylene-diamine there are obtained 950 parts of monobutyl-ethylene-diamine boiling at 62° C.–64° C. under a pressure of 10 mm. and 160 parts of dibutyl-ethylene-diamine boiling at 98° C.–102° C. under a pressure of 10 mm. The monobutyl-ethylene-diamine is a colorless, readily mobile, strongly diacid base which slightly fumes when exposed to air. The base is miscible, while heating, in all proportions with water.

2. N-heptanal and ethylene-diamine are hydrogenated as it is described in Example 1. The mixture of bases produced is taken up in dilute hydrochloric acid, extracted with ether for separating the neutral, oily admixtures, the hydrochlorides are decomposed with a strong lye and the bases are taken up in ether and fractionated. The monoheptyl-ethylene-diamine boils at a temperature between 80° C. and 82° C. under a pressure of 0.6 mm. and is readily soluble in water.

3. 100 parts of 2-ethyl hexanal in 50 parts of methanol and 80 parts of ethylene-diamine are hydrogenated after the addition of 50 parts of the catalyst named in Example 1 at 90° C.–120° C. and under a pressure of 80 atmospheres. The hydrogenation product obtained is worked up in the manner described in Example 1 and 80 parts of N-2-ethylhexyl-ethylene-diamine boiling at 105° C. under a pressure of 4 mm. are then obtained.

4. 16 parts of laurinaldehyde and 40 parts of ethylene-diamine in 50 parts of methanol are hydrogenated after the addition of 30 parts of the catalyst named in Example 1 at a temperature between 100° C. and 130° C. under a pressure of 80 atmospheres. The hydrogenation product formed is worked up as it is described in Example 2. There are obtained 12 parts of N-dodecyl-ethylene-diamine boiling at 170° C. under a pressure of 9 mm., in the form of a colorless oil which is sparingly soluble in water and readily soluble in dilute acids.

5. 140 parts of oleylaldehyde and 80 parts of ethylene-diamine dissolved in 200 parts of alcohol are hydrogenated after the addition of 50 parts of the catalyst named in Example 1 at a temperature between 90° C. and 120° C. under a pressure of 70 atmospheres. The hydrogenation product is worked up as it is described in Example 2. There are obtained 80 parts of N-octodecyl-(or octodecenyl)-ethylene-diamine boiling between 190° C. and 200° C. under a pressure of 1 mm. in the form of a colorless oil which is sparingly soluble in water and readily soluble in dilute acids; vigorously foaming solutions are produced thereby.

6. A mixture of 87 parts of propionaldehyde, 120 parts of ethylene-diamine and 50 parts of methanol is hydrogenated after the addition of 50 parts of the catalyst named in Example 1 first at a temperature between 80° C. and 90° C. and then at 100° C. and under a pressure of 80 atmospheres. The hydrogenation product is worked up as it is described in Example 1; there are obtained 65 parts of N-n-propyl-ethylene-diamine boiling at 44° C.–46° C. under a pressure of 10 mm. The base obtained is thinly liquid and miscible with water in every proportion.

7. 106 parts of benzaldehyde are caused to flow into a mixture of 100 parts of ethylene diamine and 50 parts of methanol, while cooling; after the addition of 80 parts of the catalyst named in Example 1 the mixture is hydrogenated at a temperature of 80° C.–100° C. under a pressure of 70 atmospheres. The product obtained is worked up as it is described in Example 1. There are obtained 100 parts of N-benzyl-ethylene-diamine boiling at 105° under a pressure of 3 mm. and moreover 20 parts of dibenzyl-ethylene-diamine boiling at a temperature between 205° C. and 207° C. under a pressure of 3 mm. Said dibenzyl-ethylene-diamine may be transformed by means of hydrochloric acid into the dihydrochloride.

8. A mixture of 120 parts of ethylene-diamine and 120 parts of acetophenone dissolved in 100 parts of methanol is hydrogenated after the addition of 100 parts of the catalyst named in Example 1 at a temperature between 90° C. and 140° C. under a pressure of 80 atmospheres. The product is worked up as it is described in Example 2. There are obtained 60 parts of N-[phenyl-(1)-ethyl]-ethylene-diamine boiling at 92° C.–94° C. under a pressure of 0.5 mm. The base is readily soluble in water. Moreover phenyl-(1)-ethyl-amine is obtained in a small quantity.

9. A mixture of 116 parts of hexamethylene-diamine dissolved in 50 parts of methanol, and 72 parts of n-butyraldehyde is hydrogenated after the addition of 80 parts of a hydrogenation catalyst at a temperature between 70° C. and 90° C. under a pressure of 60 atmospheres. The product is worked up as it is described in Example 1. There are obtained 80 parts of monobutyl-hexamethylene-diamine boiling at 115° C.–120° C. under a pressure of 6 mm. in the form of an oily liquid readily soluble in water.

10. 348 parts of hexamethylene-diamine, 318 parts of benzaldehyde and 150 parts of methanol are mixed and after the addition of 300 parts of a nickel catalyst of 5 per cent strength the mixture is hydrogenated for 3 hours at a temperature between 70° C. and 80° C. under a pressure of 30–70 atmospheres. The product obtained is worked up in the manner described in Example 1. There are obtained 350 parts of monobenzyl-hexamethylene-diamine boiling at 155° C. under a pressure of 3 mm.

11. A mixture of 100 parts of ethylene-diamine and 100 parts of furfurol is hydrogenated after the addition of 50 parts of a catalyst consisting of nickel and pumice stone at a temperature between 70° C. and 90° C. under a pressure of 30–80 atmospheres above normal pressure. The product obtained is worked up as it is described in Example 1. There are obtained 70 parts of 2-furyl-methyl-ethylene-diamine boiling at 109° C.–111° C. under a pressure of 13 mm. The freshly distilled colorless base is miscible with water in all proportions.

12. A mixture of 100 parts of benzaldehyde, 100 parts of diethylene-triamine and a suspension of 30 parts of a catalyst consisting of nickel and pumice stone in 100 parts of ethanol is hydrogenated at a temperature between 130° C. and 140° C. under a pressure of 20–80 atmospheres above normal pressure until the absorption of hydrogen is complete. The N-benzyl-diethylene-triamine obtained after the hydrogenation product has been worked up as it is described in Example 1 is a feebly yellowish oil boiling at 158° C.–162° C. under a pressure of 1.2 mm.

13. A mixture of 116 parts of hexamethylene-diamine and 180 parts of 2-ethyl-hexanal is hydrogenated, after the addition of a suspension of 10 parts of palladium-animal charcoal of 5 per cent strength in 100 parts of methanol, at a temperature between 50° C. and 70° C., suitably by applying a pressure above atmospheric pressure. The product obtained is worked up as it is described in Example 1. There are obtained 160 parts of N-2-ethylhexyl-hexamethylene-diamine boiling between 145° C. and 147° C. under a pressure of 2.5 mm.

14. 0.5 part of platinum oxide according to Adams is reduced by hydrogenation in an aqueous suspension so as to obtain finely subdivided platinum; a mixture of 116 parts of hexamethylene-diamine and 100 parts of formaldehyde of 30 per cent strength is then added and the whole is hydrogenated at 30° C. to 70° C. under a pressure above atmospheric pressure. The product obtained is worked up as it is described in Example 1. There are obtained 120 parts of a liquid mixture of bases boiling at 80° C.–90° C. under a pressure of 3 mm. Unaltered hexamethylene-diamine may be separated from said mixture by freezing.

15. A mixture of 10.2 parts of pentamethylene-diamine and 10.7 parts of 5-chloropyridine-3-aldehyde dissolved in 20 parts of methanol is hydrogenated after the addition of 5 parts of a catalyst consisting of nickel and pumice stone, at a temperature between 70° C. and 120° C. under a pressure of 20–80 mm. above atmospheric pressure. The N-(5-chloropyridyl-3-methyl)-pentamethylene-diamine obtained after the hydrogenation product has been worked up as described in Example 1 is, when freshly distilled, a colorless oil boiling at a temperature between 165° C. and 168° C. under a pressure of 3 mm. The oil is miscible in all proportions with water.

I claim:

1. The process of preparing alkylene polyamines, mono-alkyl-substituted in one amino group which comprises condensing a diamine selected from the group consisting of ethylene diamine, propylene diamine, tetramethylene diamine, pentamethylene diamine, and hexamethylene diamine with an aliphatic aldehyde in approximately molecular ratio and catalytically hydrogenating the condensation product at a temperature of 60–150° C. and a pressure of 20–80 atmospheres and recovering the monosubstituted diamine.

2. The process as in claim 1 for preparing N-mono-butyl hexamethylene diamine in which the diamine is hexamethylene diamine, and the aliphatic aldehyde is butyraldehyde.

3. The process as in claim 1 for preparing N - mono - methyl - hexamethylene diamine in which the diamine is hexamethylene diamine and the aldehyde is formaldehyde.

4. The process as in claim 1 for preparing N-octadecyl-ethylene diamine in which the diamine is ethylene diamine and the aldehyde is oleylaldehyde.

RODERICH GRAF.